United States Patent
Wemmer

(10) Patent No.: US 7,251,867 B2
(45) Date of Patent: Aug. 7, 2007

(54) QUICK-MOUNT INTERLOCKING ATTACHMENT SYSTEM

(75) Inventor: Jeffrey M. Wemmer, Odessa, TX (US)

(73) Assignee: Best Made Designs, L.L.C., Monahans, TX (US)

(*) Notice: Subject to any disclaimer, the term of this patent is extended or adjusted under 35 U.S.C. 154(b) by 0 days.

(21) Appl. No.: 11/485,176

(22) Filed: Jul. 11, 2006

(65) Prior Publication Data

US 2007/0017073 A1   Jan. 25, 2007

Related U.S. Application Data

(62) Division of application No. 10/626,897, filed on Jul. 24, 2003, now Pat. No. 7,080,430.

(51) Int. Cl.
*A44B 21/00* (2006.01)
(52) U.S. Cl. .................. 24/578.13; 24/3.7; 24/578.17; 24/580.1; 24/DIG. 37
(58) Field of Classification Search ............... 24/3.1, 24/3.5, 3.7, 3.9, 573.09, 578.1, 580.1, 578.13, 24/578.17, 579.09, DIG. 37; 224/675; 2/102, 2/247, 249
See application file for complete search history.

(56) References Cited

U.S. PATENT DOCUMENTS

| 842,498 | A | * | 1/1907 | Schmidt | 24/578.1 |
|---|---|---|---|---|---|
| 1,689,399 | A | * | 10/1928 | Malone | 224/622 |
| 3,114,486 | A | * | 12/1963 | Flexman | 224/628 |
| 3,698,045 | A | * | 10/1972 | Redden | 24/580.1 |
| 4,231,135 | A | * | 11/1980 | Fradin | 16/225 |
| 4,673,070 | A | * | 6/1987 | Ambal | 190/108 |
| 4,799,298 | A | * | 1/1989 | Matoba | 24/695 |
| 4,934,573 | A | * | 6/1990 | Jaeger | 224/628 |
| 5,205,448 | A | * | 4/1993 | Kester et al. | 224/575 |

(Continued)

FOREIGN PATENT DOCUMENTS

CA            642244       *  6/1962

*Primary Examiner*—James R. Brittain
(74) *Attorney, Agent, or Firm*—Howison & Arnott, L.L.P.

(57) ABSTRACT

An interlocking attaching system comprises a substrate adapter, an accessory adapter and a discrete locking member. The substrate adapter includes a base for affixing to a substrate object and a plurality of spaced apart raised regions disposed along a first longitudinal axis. The raised regions have slots defining a first plurality of passages oriented parallel to the first longitudinal axis and aligned with one another. The accessory adapter includes a base for affixing to an accessory object and a plurality of spaced apart raised regions disposed along a second longitudinal axis. The raised regions have slots defining a second plurality of passages oriented parallel to the second longitudinal axis and aligned with one another. The spacing between the locations of the raised regions of the adapters are dimensioned to position at least one raised region of one of the adapters between at least two raised regions of the other adapter when the adapters are in operational alignment, i.e., with their respective top sides together and with their respective passage aligned. The locking member is removably insertable through the passages on both adapters when the adapters are in operational alignment. Insertion of the locking member through the passages of both adapters when the adapters are in operational alignment interlocks the accessory object to the substrate object, and withdrawal of the locking member from the passages releases the accessory object from the substrate object.

19 Claims, 14 Drawing Sheets

U.S. PATENT DOCUMENTS

| | | | | |
|---|---|---|---|---|
| 5,259,093 A | * | 11/1993 | D'Annunzio | 24/3.9 |
| 5,465,425 A | * | 11/1995 | Crispin | 2/102 |
| 5,604,958 A | * | 2/1997 | Anscher | 24/3.1 |
| 5,632,071 A | * | 5/1997 | Maunder | 24/580.1 |
| 5,724,707 A | * | 3/1998 | Kirk et al. | 24/3.7 |
| 5,815,843 A | * | 10/1998 | Brillhart et al. | 2/247 |
| 6,108,816 A | * | 8/2000 | Bradley | 2/102 |

* cited by examiner

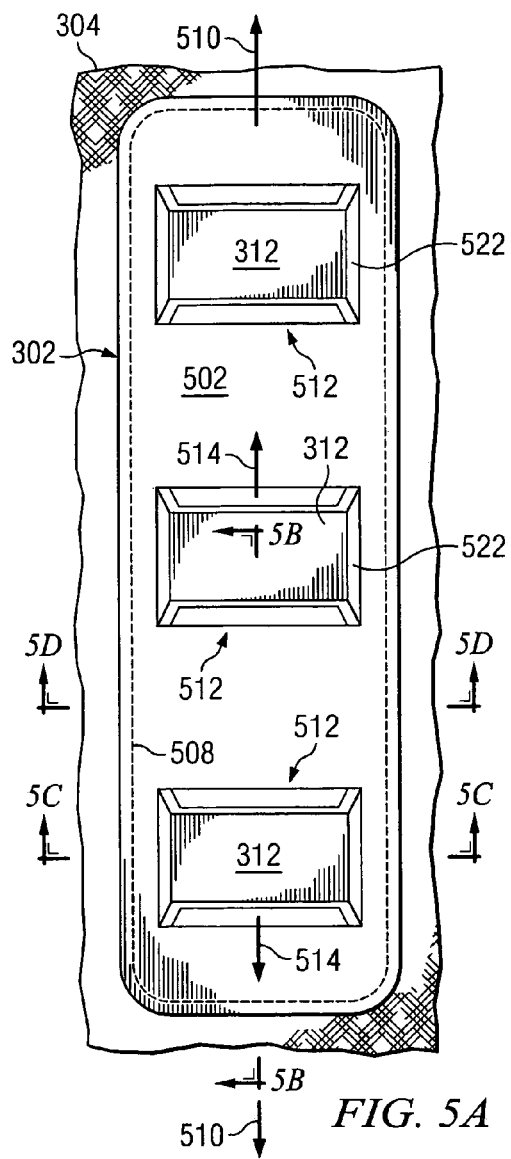
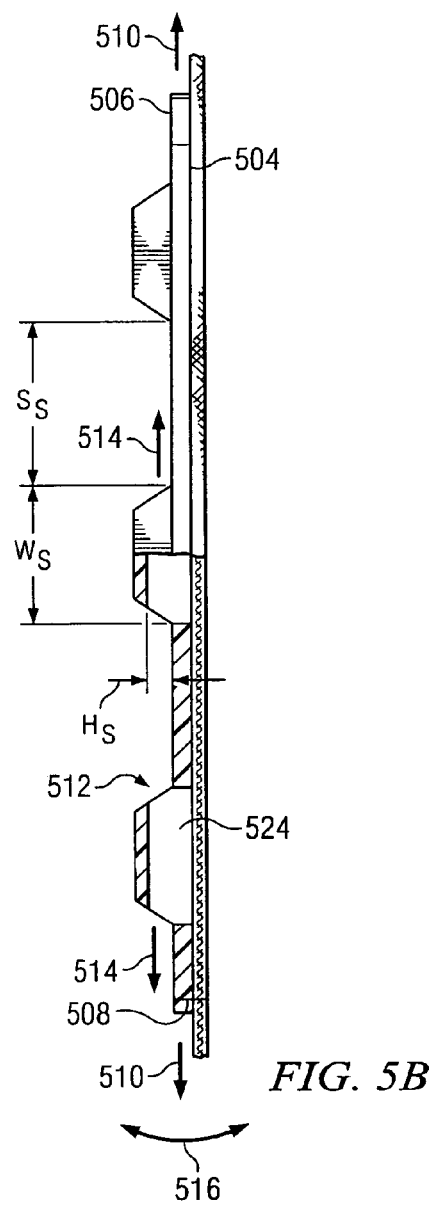
FIG. 5A
FIG. 5B
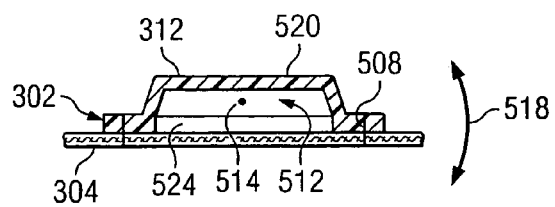
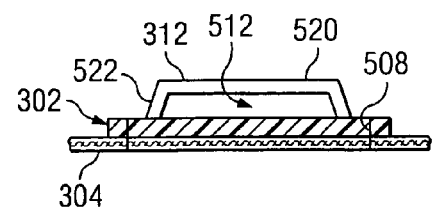
FIG. 5C
FIG. 5D

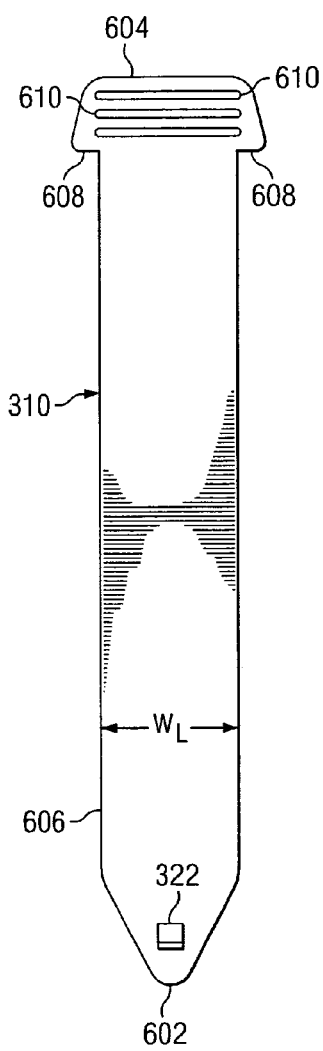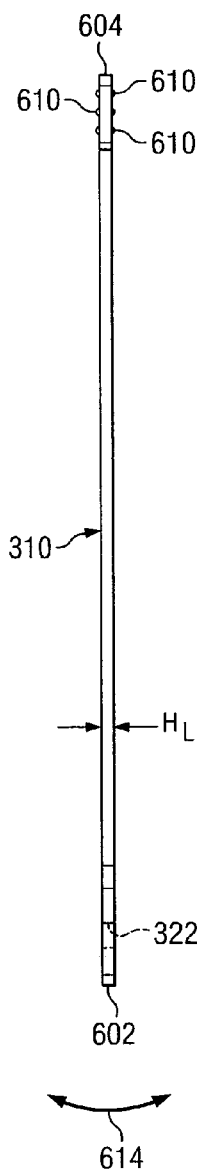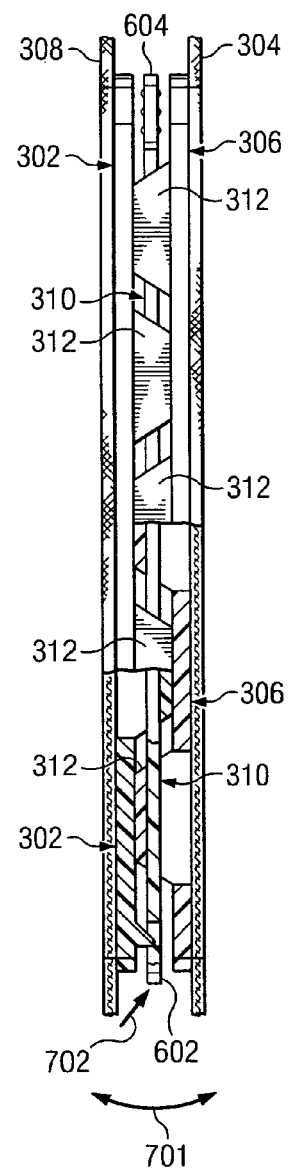
FIG. 6A
FIG. 6B
FIG. 7

QUICK-MOUNT INTERLOCKING ATTACHMENT SYSTEM

CROSS-REFERENCE TO RELATED APPLICATIONS

This application is a Divisional of U.S. patent application Ser. No. 10/626,897 filed Jul. 24, 2003 now U.S. Pat. No. 7,080,430.

TECHNICAL FIELD OF THE INVENTION

This invention relates generally to fasteners, connectors and attaching systems, and more particularly, to an interlocking attaching system for removably securing pockets, pouches or other modular accessories to a garment, backpack or other substrate.

BACKGROUND OF THE INVENTION

It is known to use interlocking attaching systems to removably secure pockets, pouches and the like to garments such as vests or backpacks. Some prior art systems, such as that disclosed in U.S. Pat. No. 5,724,707, utilize a plurality of spaced-apart webbings sewn in parallel strips across the mounting surface of both objects. The stitching which holds the webbing in place is perpendicular to the webbing and spaced apart to create channels there between. A flexible strap is affixed to one of the objects. The free end of the strap is passed in sequence first through the webbing channels on the first object, then back through the webbing channels on the second object, and so forth to interlock the two objects. Similar prior art systems are widely used (e.g., by the military), however, such systems have a number of significant drawbacks. These include the requirement for careful placement and alignment of webbing strips on each object, requirements for holding the webbing in position during stitching, and requirements for a large number of separate stitching operations on each webbing to form the channels. Each tack stitch represents a potential failure or defect site in the product, thus, there are a high number of potential failure sites associated with prior art webbing-type systems. There is typically a high instance of post-manufacturing rejection (e.g., during quality control inspection) due to human error in the placement and alignment of webbing strips. Rejected product typically cannot be salvaged and is thus worthless. Each of these drawbacks tends to increase the manufacturing costs for articles utilizing this attaching system.

Additionally, when exposed to water (including rain or user perspiration) or used in wet or humid environments, the prior art webbing-type attachment systems can gain significant weight from water absorption. Even when made of a polymer material such as nylon, the woven webbing is porous and inherently absorbent due to the great surface area of the woven material and the water-holding voids between the fibers. Once saturated with water, webbing-type systems can remain wet for long periods, especially in cold or humid conditions. The increased weight of wet webbing-type attachment systems increases the load on the soldier/user wearing the system, and will typically result in reduced mobility performance and/or reduced amounts of equipment and/or supplies (e.g., ammunition) that can be carried. Further still, where weight-sensitive transportation is employed (e.g., transportation of users/soldiers by airplane or helicopter), the cumulative weight increase of multiple water-saturated webbing-type attachment systems worn by the passengers will reduce the payload and/or performance of the aircraft.

Alternative attaching systems that avoid the use of webbing strips have been proposed. For example, the systems disclosed in U.S. Pat. Nos. 5,815,843 and 4,673,070 each include a pair (one "male" and one "female") of one-piece members having interfitting rails or channels that can be affixed to the objects to be joined (one member on each object). Objects equipped with male adapters can be slidingly engaged to other objects equipped with a female adapter. Such attaching systems eliminate many of the drawbacks associated with the positioning, holding and stitching operations of webbing-type systems, however, such systems are not compatible with existing equipment fitted with webbing-based systems. This means that adoption of these attaching systems would make large quantities of existing equipment fitted with webbing-based attaching systems obsolete.

A need therefore exists for an attaching system that overcomes these shortcomings of the prior art.

SUMMARY OF THE INVENTION

The present invention disclosed and claimed herein comprises, in one aspect thereof, an interlocking attaching system for removably securing an accessory object to a substrate object. The system comprises a one piece molded substrate adapter, a one piece molded accessory adapter and a discrete locking member. The substrate adapter includes a generally flat base having a bottom side for affixing to the substrate object and a top side having a plurality of raised regions formed thereon at spaced apart locations disposed along a first main axis. The raised regions have slots formed therein defining a first plurality of passages oriented parallel to the first main axis and aligned with one another along a first passage axis. The accessory adapter includes a generally flat base having a bottom side for affixing to the accessory object and a top side having a plurality of raised regions formed thereon at spaced-apart locations disposed along a second main axis. The raised regions have slots formed therein defining a second plurality of passages oriented parallel to the second main axis and aligned with one another along a second passage axis. The spacing between the locations of the raised regions of the adapters is dimensioned to position at least one of the raised regions of one of the adapters between at least two of the raised regions of the other adapter when the adapters are placed in operational alignment with their respective top sides together and the with the first and second passage axes aligned with one another. The locking member has a leading end and a trailing end and is removably insertable leading-end-first through the passages on the raised regions of both of the adapters when the adapters are in operational alignment. Insertion of the locking member through the passages on the raised regions of both of the adapters when the adapters are in operational alignment interlocks the accessory object to the substrate object, and withdrawal of the locking member from the passages releases the accessory object from the substrate object.

The present invention disclosed and claimed herein comprises, in another aspect thereof, a interlocking attaching system for removably securing an accessory object to a substrate object. The system comprises a substrate adapter, an accessory adapter and a discrete locking member. The substrate adapter includes a base having a bottom side for affixing to the substrate object and a top side having at least one loop column formed thereon. Each loop column includes a plurality of loops disposed at spaced apart locations along a column axis and oriented so as to define a common passage therethrough. The accessory adapter includes a base having a bottom side for affixing to the accessory object and a top side having at least one loop column formed thereon. The locking member is removably insertable through the common passages of both of the adapters. The spacing between the loops of the adapters is dimensioned to position at least one of the loops of each loop column of one of the adapters between at least two of the loops of each corresponding loop column of the other adapter when the adapters are placed in operational alignment with their respective top sides together and with the common passages of the corresponding loop columns aligned. Insertion of the locking member into the common passages of the respective adapters when the adapters are in operational alignment interlocks the accessory object to the substrate object, and withdrawal of the locking member from the common passages releases the accessory object from the substrate object.

The present invention disclosed and claimed herein comprises, in still another aspect thereof, a substrate adapter for removably securing an accessory object to a substrate object. The substrate adapter is a one-piece article comprising a base having a bottom side for affixing to the substrate object and a top side having at least two loop columns formed thereon. Each loop column includes a plurality of loops disposed at spaced apart locations along a column axis and oriented so as to define a common passage therethrough. All of the column axes are parallel to one another.

The present invention disclosed and claimed herein comprises, in yet another aspect thereof, an accessory adapter for removably securing an accessory object to a substrate object in conjunction with at least one locking member having a first component of a latching mechanism. The accessory adapter is a one-piece article comprising a base having a bottom side for affixing to the accessory object and a top side having at least one loop column formed thereon. Each loop column includes a plurality of loops disposed at spaced apart locations along a column axis and oriented so as to define a common passage therethrough and all of the column axes are parallel to one another. The accessory adapter of this aspect further comprises at least one second component of the latching mechanism, where each second component of the latching mechanism is disposed on the base in association with a particular loop column for releasably securing one locking member in a predetermined position of engagement with the accessory adapter when the locking member is inserted into the common passage of the respective loop column.

BRIEF DESCRIPTION OF THE DRAWINGS

FIG. 4A is a top view;

FIG. 4B is a side view with a partial cross section taken along line 4B-4B of FIG. 4A;

FIG. 4C is a cross-sectional end view taken along line 4C-4C of FIG. 4A;

FIG. 4D is a cross-sectional end view taken along line 4D-4D of FIG. 4A;

FIGS. 5A-5D illustrate additional details of the substrate adapter for the attaching system of FIG. 3. In particular:

FIG. 5A is a top view;

FIG. 5B is a side view with a partial cross section taken along line 5B-5B of FIG. 5A;

FIG. 5C is a cross-sectional end view taken along line 5C-5C of FIG. 5A;

FIG. 5D is a cross-sectional end view taken along line 5D-5D of FIG. 5A;

FIGS. 6A-6B illustrate additional details of the locking members for the attaching system of FIG. 3. In particular:

FIG. 6A is a top view;

FIG. 6B is a side view;

FIG. 7 is a side view of the components of the interlocking attaching system in the interlocked configuration, with portions shown in cross section;

FIG. 12A is a side view;

FIG. 12B is a rear view;

FIG. 12C is a bottom view;

FIG. 15A-5F illustrate an accessory adapter in accordance with another embodiment of the current invention. In particular:

FIG. 15A is a top view;

FIG. 16A is a top view;

FIG. 16B is a side view;

FIG. 16C is a side cross-sectional view taken along line 16C-16C of FIG. 16A;

FIG. 16D is an end view;

FIG. 16E is an end cross-sectional view taken along line 16E-16E 6f FIG. 16A;

FIG. 16F is an end cross-sectional view taken along line 16F-16F of FIG. 16A;

DETAILED DESCRIPTION OF THE INVENTION

The subject matter of the present invention will be particularly pointed out in the appended claims. For a better understanding of the present invention, its various objects and advantages, reference is made to the following detailed description taken in conjunction with the accompanying drawings.

Figure 1:
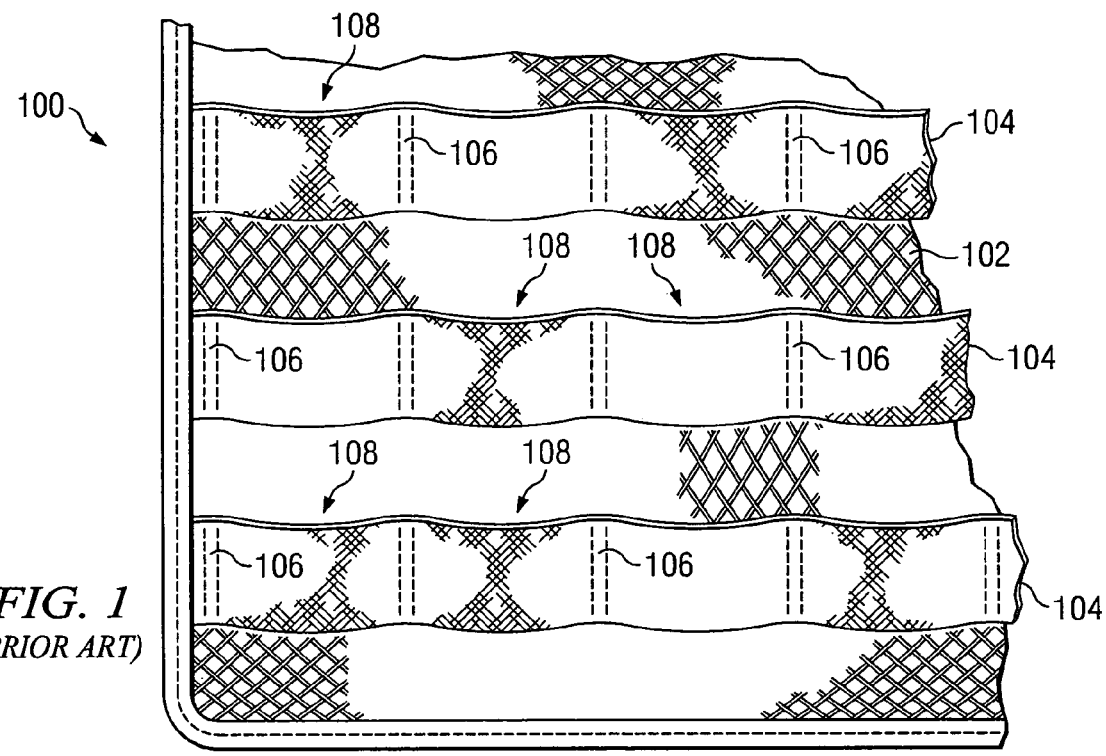
FIG. 1 shows a portion of a vest fitted with one component of a PRIOR ART webbing-type interlocking system.
Figure 2:
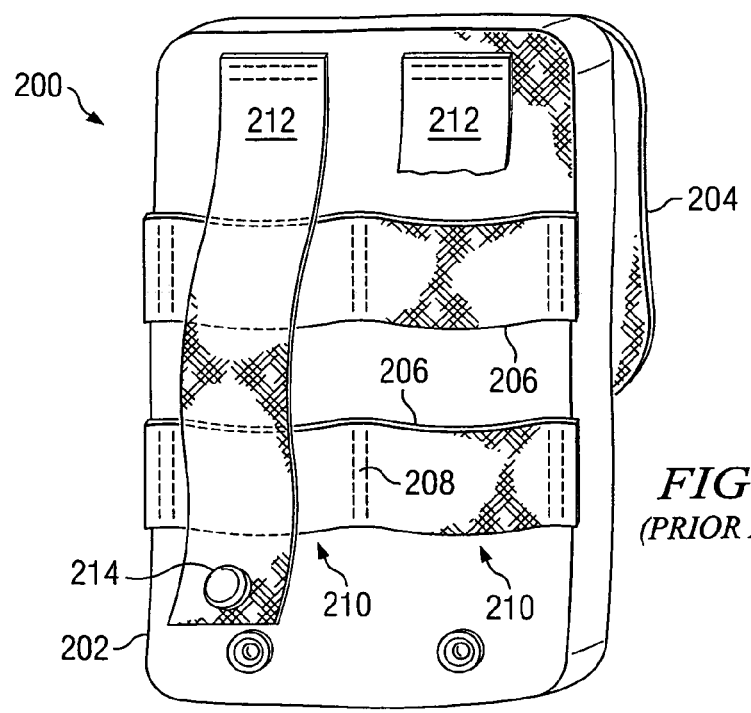
FIG. 2 shows a modular pocket fitted with cooperating components of the PRIOR ART interlocking system.

Referring now to FIGS. 1 and 2, there is illustrated a prior art interlocking system of the webbing type for attaching accessory objects to a substrate garment. FIG. 1 illustrates a portion of a load bearing vest 100, which in this case is the substrate object adapted to use the prior art attachment system. The vest 100 includes a mesh body 102 which allows air to circulate to the wearer. The vest 100 is adapted to use the prior art attachment system by the addition of narrow strips of webbing 104 attached in parallel bands across its surface. The webbing 104 is attached to the vest body 102 with a series of tack stitches 106 which run perpendicular to the webbing and are spaced apart along the webbing to create channels (indicated by arrows 108) there between. The stitching 106 on each of the webbing strips 104 must be aligned with the stitching on the other strips such that the channels 108 are continuous in the vertical direction across the strips. These channels 108 will receive an attaching strap from the accessory object as explained below.

FIG. 2 shows a rear view of a modular pocket 200 that is adapted for use with the prior art webbing type attachment system. The prior art pocket 200 includes a body 202 with an openable flap 204 on the front. Attached to the back of the pocket 200 are strips of webbing 206 which have been stitched to the rear side of the pocket using perpendicular tack stitches 208 to form vertical channels (indicated by arrows 210) similar to those described on the webbing 104 of the vest 100. The webbing strips 206 on the pocket 200 are spaced apart such that they will fit between the webbing strips 104 on the vest 100 when the two objects are brought together. The prior art pocket 200 further comprises one or more attaching strips 212 attached to the top of the pocket. It will be appreciated that a portion of the right strap 212 in FIG. 2 has been omitted for purposes of illustration. When the modular pocket 200 is placed against the vest 100 with the webbing strips 104 and 106 interleaved and the vertical channels 108 and 210 aligned, the attaching straps 212 may be sequentially interwoven through first the channel on the vest, then the channel on the pocket, then the channel on the vest again, etc. in order to interlock the pocket to the vest. A snap 214 or other latching device is provided at the end of the strap 212 in order to prevent it from disengaging from the interlocked condition.

While the prior art webbing type interlocking attachment system described above has been widely adopted, especially by the military, garments and accessory objects adapted to utilize this system can be relatively expensive to produce. This is due to the high manufacturing costs resulting primarily from the numerous discrete manufacturing operations required to produce the prior art attachment system. For example, each webbing strip 104 and 206 must be individually positioned on the object and held in position as each of the tack stitches 106 and 208 are sewn individually. For such webbing type attachment systems to work properly, all of the webbing strips 104 and 206 must be accurately aligned on the garment and each of the tack stitches 106 and 208 on each of the strips must be carefully aligned in order to provide proper registration of the strips and proper positioning of the channels 108 and 210. Such aligning and sewing is very labor intensive and hence, relatively expensive. Fixtures or jigs may be used to assist in holding the webbing strips in position and in making the tack stitches on the objects. However, the time and expense involved to produce and set up such equipment can also be costly. In addition, the cost to change the equipment setup from making one type of garment or modular accessory of the webbing type to making a different type of garment or modular accessory of the webbing type is relatively expensive, often making short production runs of webbing type equipment cost prohibitive.

Figure 3:
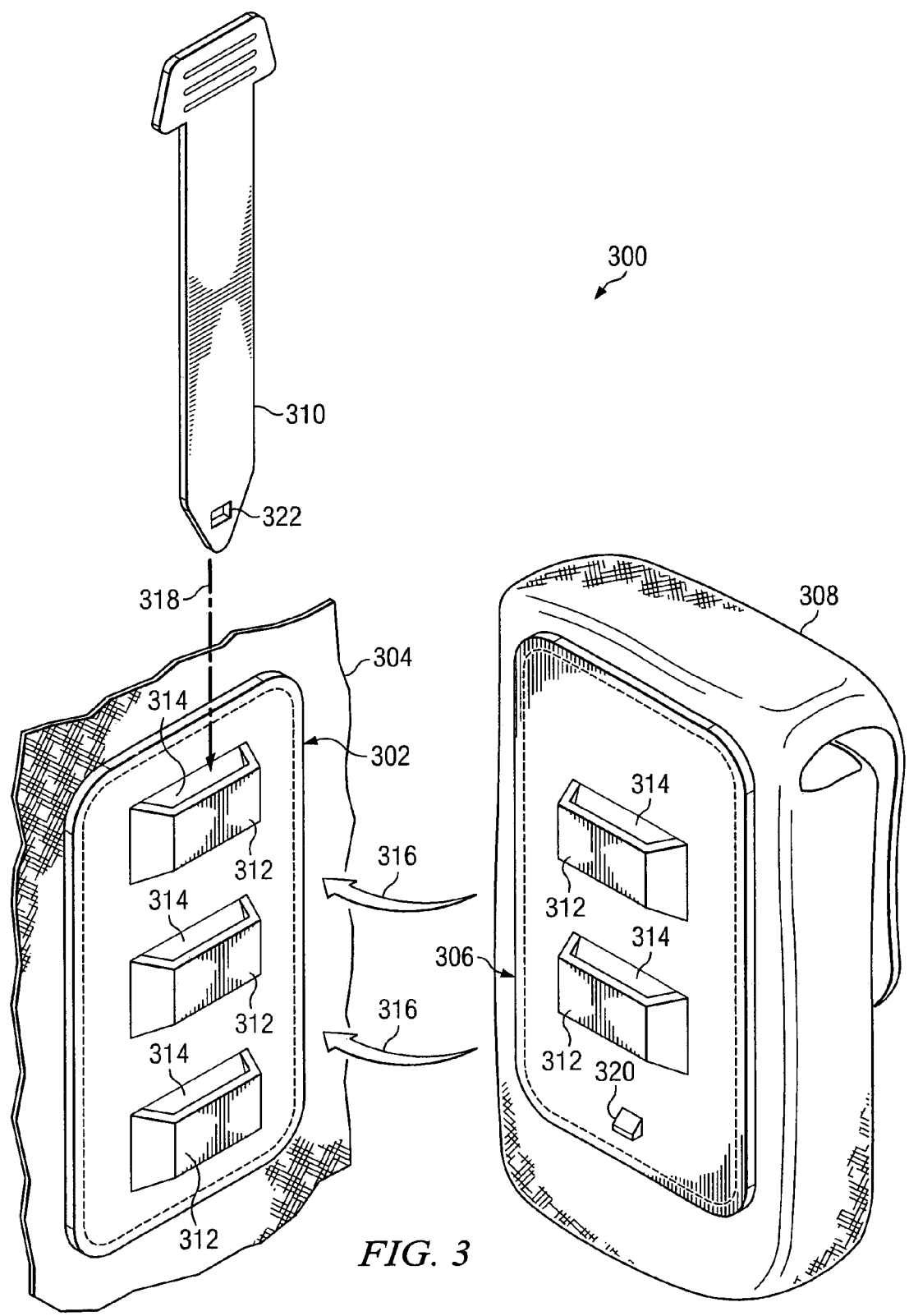
FIG. 3 shows a portion of a garment and a modular accessory fitted with an interlocking attaching system in accordance with one aspect of the current invention.

Referring now to FIG. 3, there is illustrated one embodiment of an interlocking attaching system in accordance with the current invention. The attaching system 300 comprises a substrate adapter 302 which is affixed to the substrate object 304 (in this case a portion of a mesh vest), an accessory adapter 306 which is affixed to the accessory object 308 (in this case a modular pocket) and a discrete locking member 310. As will be further described in detail below, the top side of each adapter 302 and 306 has a plurality of raised regions 312 formed thereon at spaced apart locations disposed along a main axis. The raised regions have slots 314 formed in their sides which define a plurality of passages oriented parallel to their respective main axes and aligned with one another along respective passage axes. The spacing between the locations of the raised regions 312 of the adapters 302 and 306 are dimensioned such that, when the adapters are placed in operational alignment, i.e., with their respective top sides face-to-face and with their respective passages aligned with one another, at least one of the raised regions 312 of one of the adapters will be positioned between at least two of the raised regions 312 of the other adapter. In the example illustrated in FIG. 3, each of the two raised regions 312 on the accessory adapter 306 will be positioned between two of the raised regions 312 on the substrate adapter 302 when the two adapters are brought into operational alignment as indicated by the arrows 316. Obviously, the middle raised region 312 of the substrate adapter 302 will also be positioned between the two raised regions of the accessory adapter 306.

Once the two adapters 302 and 306 have been positioned in operational alignment, the locking member 310 can be inserted leading end first (as indicated by arrow 318) through the passages 412 and 512 of both adapters, whereby the accessory object 308 will be interlocked to the substrate object 304. Preferably, the accessory adapter 306 will include a first latching mechanism component 320 for co-acting with a second latching mechanism component 322 disposed on the locking member 310 so as to releasably secure the locking member in locking engagement with the accessory adapter when it is fully inserted. To release the accessory object 308 from the substrate object 304, the process is reversed, i.e., first disengaging the latching components 320 and 322 (if present), and then withdrawing the locking member 310 from the passages 412 and 512 in both adapters 302 and 306.

Referring now to FIGS. 4A-4D, the accessory adapter 306 is illustrated in greater detail. The accessory adapter 306 includes a generally flat base 402 having a bottom side 404 and a top side 406. The bottom side 404 of the base 402 is affixed to the accessory object 308, which will typically be a modular pocket, pouch or other such accessory. While most of the accessory objects 308 will be flexible, i.e., such as objects made from cloth or fabric, it will be appreciated that the accessory adapters 306 can also be affixed to more rigid accessories such as knife scabbards or holsters. The adapter base 402 will preferably be affixed to the accessory object 308 by sewing or stitching 408 around the periphery of the adapter, however, other means of attachment can be used, for example, adhesives, heat fusing or mechanical fasteners such as rivets or brads.

The raised regions or loops 312 are formed on the top side 406 of the base 402 and disposed upon a main axis 410. The raised regions 312 have slot 314 formed therethrough defining a series of passages 412 that are oriented parallel with the main axis 410 and aligned with one another along a passage axis 414. As previously described, the spacing between the locations of the raised regions 312 are dimensioned to coact with the spacing of the raised regions on the substrate adapter 302. Put another way, the width (denoted $W_A$) of the raised regions 312 and the spacing (denoted $S_A$) between the locations of the raised regions on the accessory adapter 306 are designed to coact or cooperate with the width (denoted $W_S$) of the raised regions and the spacing (denoted $S_S$) between the locations of the raised regions on the substrate adapter 302 in order to position at least one of the raised regions on one of the adapters between at least two of the raised regions on the other adapter when the two adapters are placed in operational alignment. Further, the height (denoted $H_A$) of the slots 314 on the accessory adapter 306 and the height (denoted $H_S$) of the slots on the substrate adapter 302 above the tops of their respective bases are selected such that when the adapters are in operational alignment, the passages on both adapters line up along a common axis.

In the embodiment illustrated in FIGS. 4A-4D, the raised regions 312 have a prismatic configuration, i.e., having flat sides 416 and flat tops 418. It will be appreciated, however, that the raised regions/loops 312 may be rounded or curved or have other shapes so long as the passages 412 therethrough are aligned along a passage axis 414.

Preferably, the accessory adapter 306 will also include a first latching component 320 which will cooperate with another latching component 322 on the locking member 310 in order to secure the locking member in place once the accessory object has been secured or mounted to the substrate object. In the embodiment shown, the first latching component 320 comprises a ramp-shaped feature positioned at the leading end of the accessory adapter 306. It will be appreciated however, that the latch component 320 may be positioned at either the leading or trailing end of the accessory adapter 306, and that alternative latch configurations known for manually operable latches may be substituted for the triangular ramp.

Figure 4A:
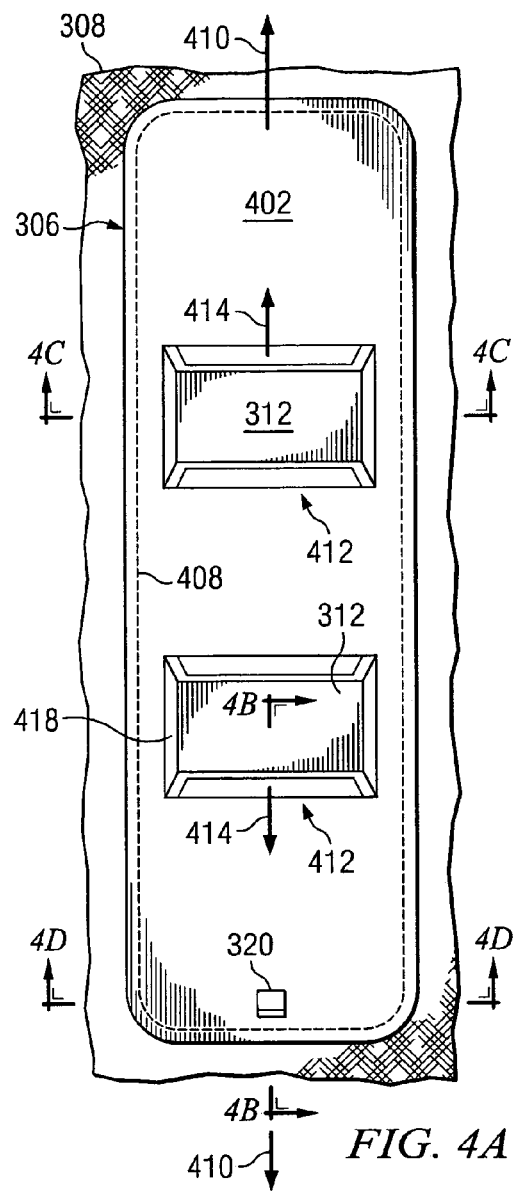
FIGS. 4A-4D illustrate additional details of the accessory adapter for the attaching system of FIG. 3. In particular.
Figure 4B:
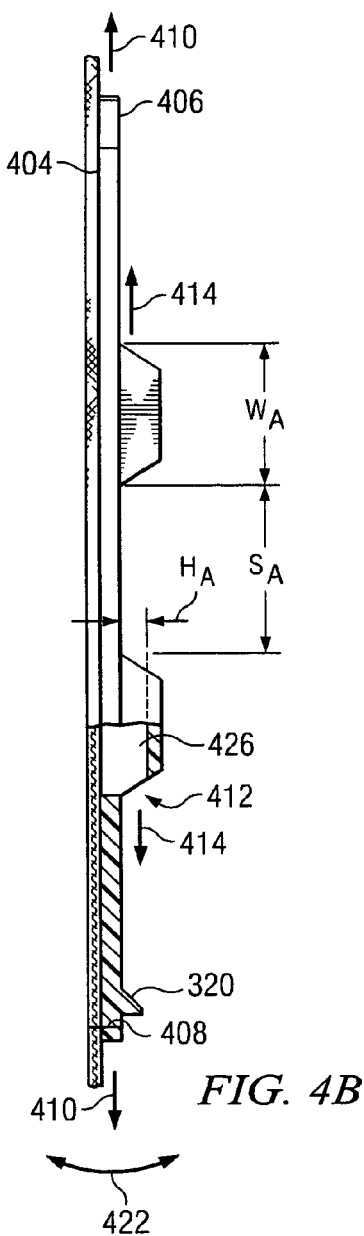
Figure 4C:
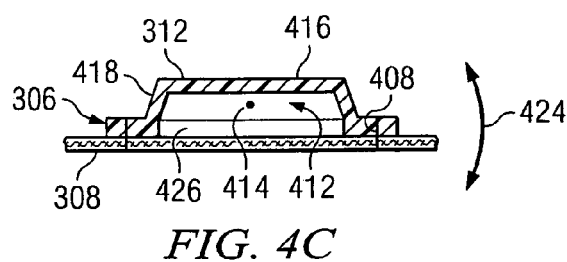
Figure 4D:
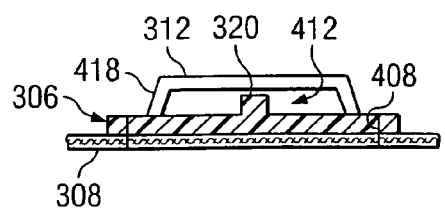

Although not required, it is preferred that the accessory adapter 306 be flexible so as to allow substantial bending in both the lateral and longitudinal directions as indicated by the arrows 422 and 424 in FIGS. 4B and 4C, respectively. This flexibility will allow the accessory adapter 306 to flex along with the pouch or other accessory object 308 to which it is attached. Also, while it is desirable that the accessory adapter 306 be made of a flexible material, it is also desirable that the raised regions 312 of the adapter are rigid enough such that the passages 412 remain open when the adapter bends. In other words, the passages 412 should remain open to allow the passage of the locking member 310 even when the adapter 306 is somewhat flexed.

The desired combination of overall flexibility and localized rigidity can be obtained by forming the accessory adapter 306 from polymer materials and by using a suitable design for the raised regions. Polymer materials believed to be most suitable for use with the accessory adapter 306 include nylons such as nylon 66, polypropylenes, and rubber-like thermoplastic polymer materials such as Santoprene® and sanoprene. It will be understood that these polymers will be used in "solid form" i.e., molded, formed or machined, and not woven from polymer fibers. Polymer materials are especially well suited for manufacturing the accessory adapter 306 as an integral one-piece article using injection molding, thermoforming, casting or similar known polymer-forming technologies. Other polymer-forming technologies, such as stereolithography, may also be used, although they are not economically advantageous at the present time.

It will be appreciated that manufacturing an accessory object 308 to use the attaching system of the current invention can be done at substantial savings compared to prior art webbing type attachment systems. As previously described, webbing type attachment systems require numerous discrete components to be sewn onto the accessory object 308 using many individual tack stitches and other manufacturing operations. Using the accessory adapter 306 of the current invention, on the other hand, requires only that the base 402 be stitched or otherwise affixed onto the accessory object 308. No complicated setup or registration is required because the accessory adapter 306 can be slightly misaligned on the accessory object 308 without affecting its ability to interface with a substrate adapter. In other words, the registration and alignment of the raised portions 312 and the slots 314 of the accessory adapter 306 are "built in" rather than being dependent on the accuracy of the attachment operations.

Further, it will be appreciated that if the width $W_A$ and the spacing $S_A$ of the raised regions 312 on the accessory adapter 306 are properly selected, then the accessory adapter will interface with prior art webbing-type attaching systems as well as with substrate adapters of the current invention. For example, if the width $W_A$ is about one inch or less, and the spacing $S_A$ is about one inch, then the accessory adapter 306 may interlock onto existing military garments having standard one inch webbing-type attachment systems (e.g., the vest 100 of FIG. 1) without requiring any modification to the military equipment (although a locking member 310 must be used).

Further still, by forming the accessory adapter 306 from "solid" polymer materials (i.e., as opposed to woven materials), the adapter will not absorb any appreciable quantity of water, and thus will not gain weight like the prior art webbing-type systems when exposed to water, rain or perspiration. As previously discussed, this weight reduction (when wet) represents a significant advantage of the current invention over the prior art.

The accessory adapter illustrated in FIGS. 4A-4D is a one-piece molded article of the type typically formed using injection molding. A one-piece article, while not required, is preferred in order to simplify manufacturing and assembly. Similarly, construction of the accessory adapter 306 by injection molding is not required, however, it is also preferred in order to maximize manufacturing simplicity and assembly cost savings. In order to facilitate the injection molding of the accessory adapter 306 using an inexpensive two piece mold process, it may be desirable to leave a clear space 426 below each of the raised regions 312.

Referring now to FIGS. 5A-5D, the substrate adapter 302 is illustrated in greater detail. The substrate adapter 302 includes a generally flat base 502 having a bottom side 504 and a top side 506. Bottom side 504 of the base is affixed to the substrate object 304, which will typically be a load bearing vest, duffle bag or other fabric garment worn or carried by a user. While most of the substrate objects 304 will be formed of flexible material, i.e., such as objects made from cloth or fabric, it will be appreciated that the substrate adapter 302 of the current invention can also be affixed to rigid surfaces such as the interior of a building or vehicle where it is desirable to mount a modular accessory. Where the substrate object 304 is made of a flexible material such as cloth, the substrate adapter base 502 will typically be affixed to the object by sewing or stitching 508 around the periphery of the adapter. As with the accessory adapter, however, other means of attaching the substrate adapter base 502 to the accessory object can also be used, for example, adhesives, heat fusing or mechanical fasteners.

The raised regions or loops 312 are formed on the top side 506 of the substrate adapter base 502 and disposed along a main axis 510. As with the accessory adapter previously described, the raised regions 312 of the substrate adapter 302 have slots 314 formed therethrough defining a series of passages 512 oriented parallel to the main axis 510 and aligned with one another along a passage axis 514. The width $W_S$ of the raised regions 312, and the spacing $S_S$ between the locations of the raised regions, on the substrate adapter 302 are dimensioned to cooperate with the spacing of the raised regions on the accessory adapter 306. For example, the embodiment illustrated in FIGS. 5A-5D includes three raised regions 312 which are dimensioned to interfit on each side of, and in between, the two raised regions 312 of the accessory adapter 306 shown in FIGS. 4A-4D. The configuration of the raised regions on both the accessory adapter 306 and the substrate adapter 302 are configured such that the respective passage axes 414 and 514 are spaced a similar dimension above the surface of their respective bases 402 and 502 so that the slots will align vertically as well as longitudinally when the adapters are brought into operational alignment.

While not required, it is preferred that the substrate adapter 302 be flexible so as to allow substantial bending in both the lateral and longitudinal directions as indicated by the arrows 516 and 518 in FIGS. 5B and 5C. This flexibility will allow the substrate adapter 302 to flex along with the substrate garment 304 or other object to which it is attached. Also, as with the accessory adapter 306, while it is desirable that the substrate adapter 302 be made of a flexible material, it is also desirable that the raised regions 312 of the adapter be rigid enough such that the passages 512 will remain open to allow passage of the locking member 310 when the adapter flexes.

As with the accessory adapter 306, the desired combination of the overall flexibility and localized rigidity may be obtained by forming a substrate adapter 302 from a suitable polymer material and by selecting a suitable shape for the loops 312. It will be understood that these polymers will be used in solid form, and not woven from polymer fibers. Polymer materials believed to be most suitable for forming the substrate adapter 302 include nylons such as nylon 66, polypropylenes and rubber-like thermoplastic polymers. These polymer materials are especially well suited for manufacturing the substrate adapter 302 using injection molding and other known polymer-forming technologies. These polymers are also well proven for use as fasteners and closures in garments and other flexible objects. By forming the substrate adapter 302 from solid polymer materials, the adapter will not absorb any appreciable quantity of water, and thus will not gain weight like the prior art webbing-type systems when exposed to water, rain or perspiration.

In the embodiment shown, the raised regions 312 on the substrate adapter 302 are prismatic, i.e., having flat sides 520 and flat tops 522 similar in configuration to the raised regions on the accessory adapter shown in FIGS. 4A-4D. It will be understood, however, that the raised regions/loops 312 on the substrate adapter 302 could be curved or have other shapes as long as the passages 512 are all aligned along a common passage axis 514. It will further be apparent that the raised regions 312 of the substrate adapter 302 and the accessory adapter 306 need not have identical configurations, but merely must be compatible in terms of raised region width, spacing between the raised regions, and height and width of the passages such that a single common passage is formed when the adapters are brought into operational alignment with their top sides together.

As previously discussed for the accessory adapter, it will be appreciated that adapting a substrate object to use the attachment system of the current invention can be done at a substantial savings compared to using prior art webbing type attachment systems. Attaching the substrate adapter 302 of the current invention requires only that the base 502 be stitched or otherwise affixed to the substrate object 304. As with the accessory adapter, no complicated setup or registration is required during manufacture because the substrate adapter 302 can be misaligned on a substrate object 304 without affecting its ability to interface with an accessory adapter. In other words, the registration and alignment of the raised portions 312 and the slots 314 of the substrate adapter 302 are built in rather than being produced by stitching during attachment to the substrate object.

If the width $W_S$ of the raised regions 312 and the spacing $S_S$ between the raised regions on the substrate adapter 302 are properly selected, then the substrate adapter may be interlocked with existing modular accessories designed for prior art webbing-type interlocking systems as well as with modular accessories equipped with the accessory adapter of the current invention. For example, if the width $W_S$ is about one inch or less, and the spacing $S_S$ is about one inch, then the substrate adapter 302 may interlock with existing military accessories (e.g., the modular pocket 200 of FIG. 2) having standard one inch webbing-type attachment systems. No modification to the existing military accessories is required, and the standard straps 212 and fasteners 214 eliminate the need for a separate locking member.

The substrate adapter 302 illustrated in FIGS. 5A-5D is a one piece molded article of the type typically formed by injection molding. While not required, a one-piece article is preferred for ease of manufacture and assembly. Similarly, the use of injection molding to form the substrate adapter 302 is not required, but it is preferred because it typically reduces the costs of producing equipment utilizing the attachment system of the current invention. In order to further facilitate the injection molding of the substrate adapter 302 using two piece molding technology, it may be desirable to leave a clear space 524 below each of the raised regions 312.

Referring now to FIGS. 6A and 6B, the locking member 310 is illustrated in greater detail. The locking member 310 is dimensioned to be removably insertable through the passages 412 and 512 on the raised regions 312 of the substrate and accessory adapters 302 and 306. Preferably, the locking member 310 will have a leading end 602 which is tapered or otherwise shaped to facilitate insertion through the passages 412 and 512. Further, the locking member 310 will preferably have a trailing end 604 designed to prevent the locking member from passing completely through the passages. In the embodiment shown, the main body 606 of the locking member 310 has a width $W_L$ and a height $H_L$ selected to allow the locking member to fit snugly within the passages 412 and 512 on the adapters, and the trailing end 604 has been extended to form a pair of flanges 608 which prevent the locking member from passing completely through the passages. The trailing end 604 also features a textured area 610 designed to provide a better gripping surface for withdrawing the locking member 310 from the slots.

Preferably, the locking member 310 will also include a second component 322 of the latching mechanism for releasably securing the locking member in place after it has been inserted into the accessory adapter. In the embodiment shown, the second component 322 of the latching mechanism comprises a square hole formed through the leading end 602 of the locking member which engages the triangular ramp component 320 on the accessory adapter 306. It will be appreciated that this latching mechanism will automatically be engaged when the locking member 310 is fully inserted into the accessory adapter 306. Manual lifting of the locking member's leading end 602 will be required to disengage the latch components 322 and 320 in order to withdraw the locking member 310. In this way, the locking member 310 may be releasably secured without the need for expensive moving parts or additional components. Clearly, any number of other latch designs known in the art may be substituted for those illustrated and utilized to secure the locking member 310 to the accessory adapter 306. These latching components are preferably located at the leading end 602 or the trailing end 604 of the locking member.

The locking member 310 will preferably be formed of a material which is sufficiently stiff to allow the locking member to be inserted through the passages 412 and 512 solely by exerting force on the trailing end 604, facilitating the quick and simple interlocking of the system components. It is also desirable that the locking member 310 have sufficient flexibility to flex in the longitudinal direction as indicated by arrows 614. Suitable materials include polymer materials such as nylons and polypropylenes. Further, if the locking member 310 is relatively thin, then metal materials such as steel or aluminum sheet may be used for the locking member.

Referring now to FIG. 7, an enlarged view is provided of the interlocking system 300 of the current invention in its interlocked condition. The accessory adapter 306, which is affixed to a portion of the accessory object 308, is shown disposed face-to-face with the substrate adapter 302, which is affixed to a portion of a substrate object 304. The two adapters 302 and 306 are positioned in operational alignment such that the raised regions 312 on each adapter interfit between the raised regions of the other adapter, and the respective passage axes 414 and 514 of the adapters are aligned with one another. The locking member 310 has been inserted through the passages 412 and 512 of the two adapters until it is fully seated with the first latch component 320 engaging the second latch component 322. In this position, while the accessory object 308 is securely mounted to the substrate object 304, the entire assembly is still free to flex in both the lateral and longitudinal directions as noted by the arrows 701. To release the accessory object from the substrate object, the process is reversed, i.e., first the leading end 602 of the locking member 310 is raised by applying force at the tip as shown by the arrow 702 until the first latch component (ramp 320) disengages from the second latch component (hole 322). Next, the trailing end 604 of the locking member 310 is gripped and pulled completely out of the passages 412 and 512 of the two adapters, thereby releasing the accessory object 308 from the substrate object 304.

Figure 8:
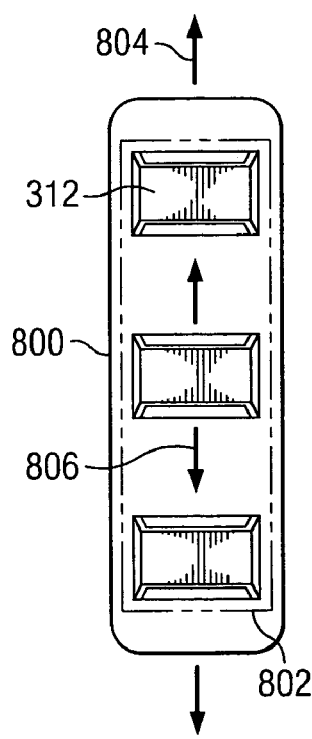
FIG. 8 illustrates a single-column substrate adapter in accordance with another aspect of the current invention.

Referring now to FIG. 8, there is illustrated a substrate adapter 800 similar in most respects to the adapter shown in FIG. 5A-5D. The spaced apart loops 312, disposed in a "column" running perpendicular to the loops themselves, may be considered to constitute a "loop column" 802 having a column axis 804 that is perpendicular to the loops. The common passage running through the loops 312 along the column axis 804 is termed a column passage 806.

Figure 9:
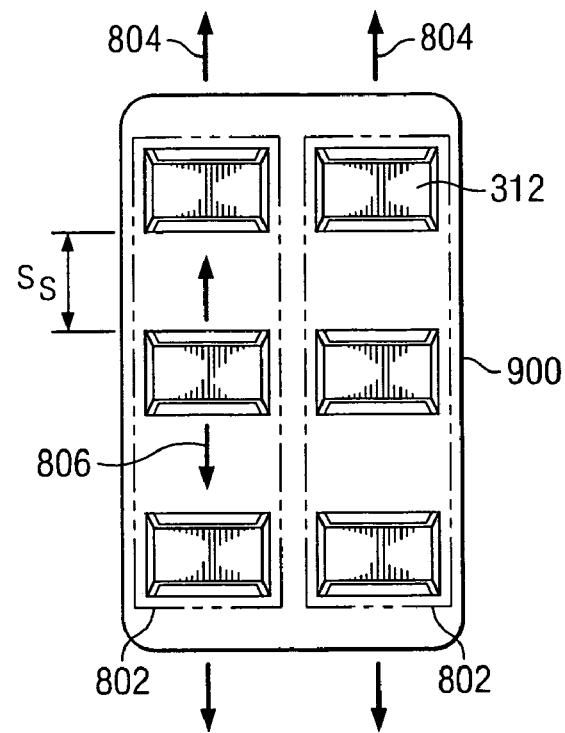
FIG. 9 illustrates a double-column substrate adapter in accordance with yet another aspect of the current invention.
Figure 10:
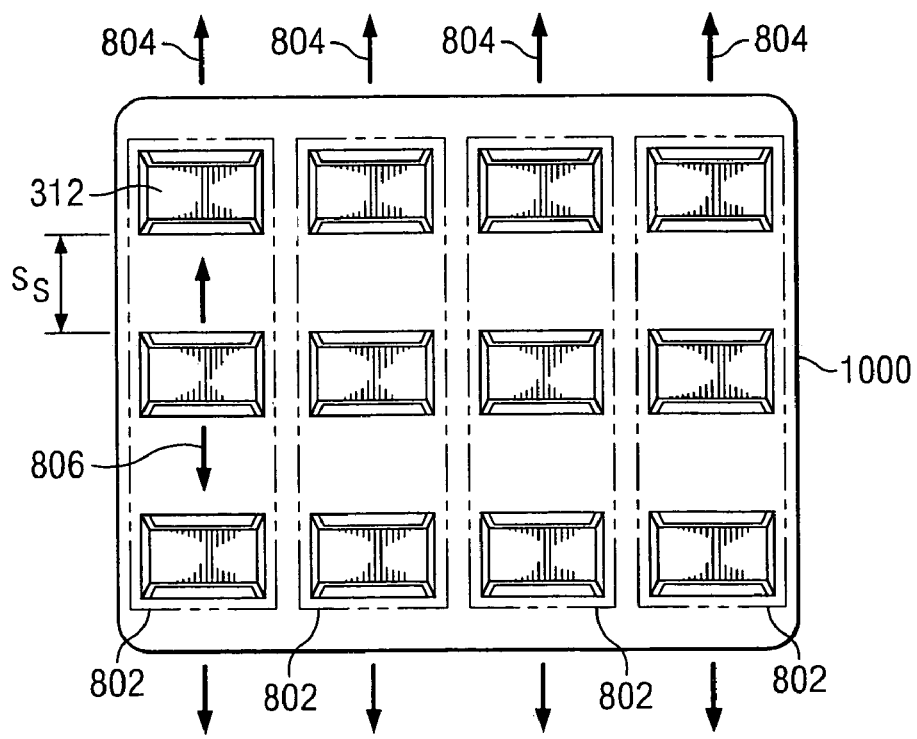
FIG. 10 illustrates a quad-column substrate adapter in accordance with still another aspect of the current invention.

Referring now to FIGS. 9 and 10, there are illustrated substrate adapters 900 and 1000 in accordance with additional embodiments the current invention. The substrate adapter 900 is a "double-column" type having two loop columns 802 with parallel column axes 804 and having identical spacing $S_S$ between the loops 312 in adjacent loop columns, thereby creating three horizontal "rows" of loops. The substrate adapter 1000 is "quad-column" type having four loop columns 802 with parallel column axes 804 and having identical spacing $S_S$ between the loops 312 in adjacent loop columns, thereby also creating three horizontal "rows" of loops. It will be understood that, aside from the increased number of columns, the substrate adapters 900 and 1000 are substantially identical in all other respects to the single column substrate adapters 302 and 800 previously described. Thus, the double-column or quad-column substrate adapters 900 and 1000 may be attached to a substrate object by simply sewing or stitching around the perimeter of the base as with a single column embodiment. The double-column substrate adapter 900 will interlock with a pair of single-column accessory adapters 306 or alternatively, with a double-column accessory adapter (see FIG. 14). In a similar fashion, the quad-column substrate adapter 1000 will interlock with any combination of single, double-or quad-column accessory adapters.

Figure 11:
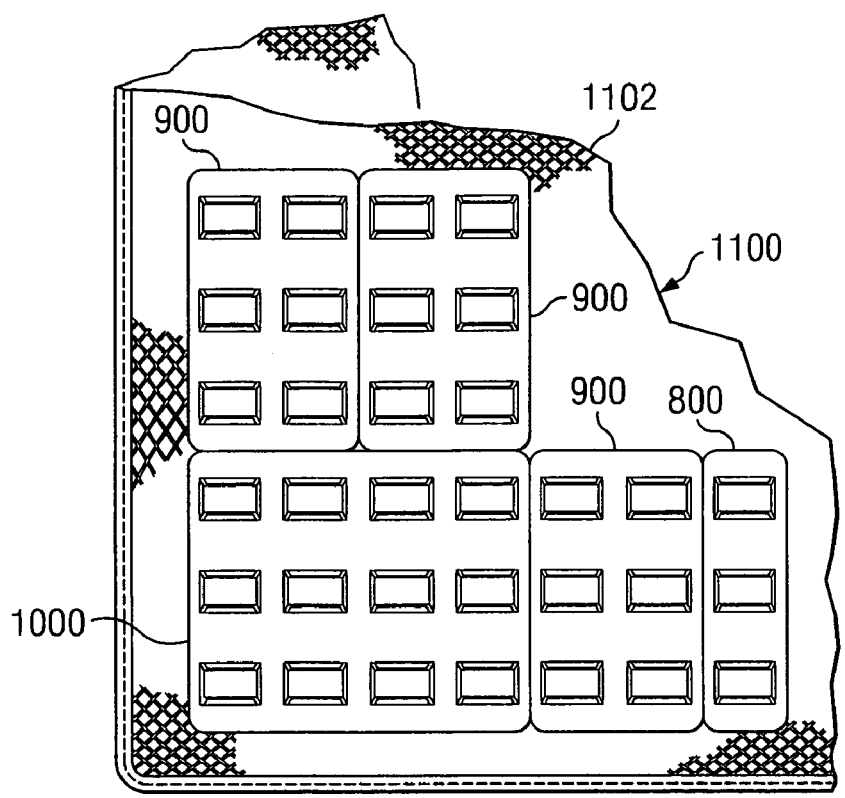
FIG. 11 illustrates a portion of a vest fitted with various substrate adapters of the current invention.

Referring now to FIG. 11, there is shown a portion of a tactical load bearing vest 1100 in accordance with another embodiment of the current invention. The vest 1100 has a mesh body 1102, affixed to which are three dual-column substrate adapters 900, one quad-column substrate adapter 1100 and one single-column substrate adapter 800, covering essentially the entire surface area of the vest with usable mounting positions. It will further be appreciated that the manufacturing operations required to attach these substrate adapters (e.g., stitching around the perimeter of each adapter) is much lower than that required to provide a similar number of attachment points using prior art webbing based systems. Further, if the loop width, loop spacing and loop height of the substrate adapters 800, 900 and 1000 are appropriately dimensioned, then the tactical vest 1100 will be totally compatible with exiting modular accessories which utilize the prior art webbing type attaching system as well as with modular accessories having accessory adapters of the current invention as described herein.

Figure 12A:
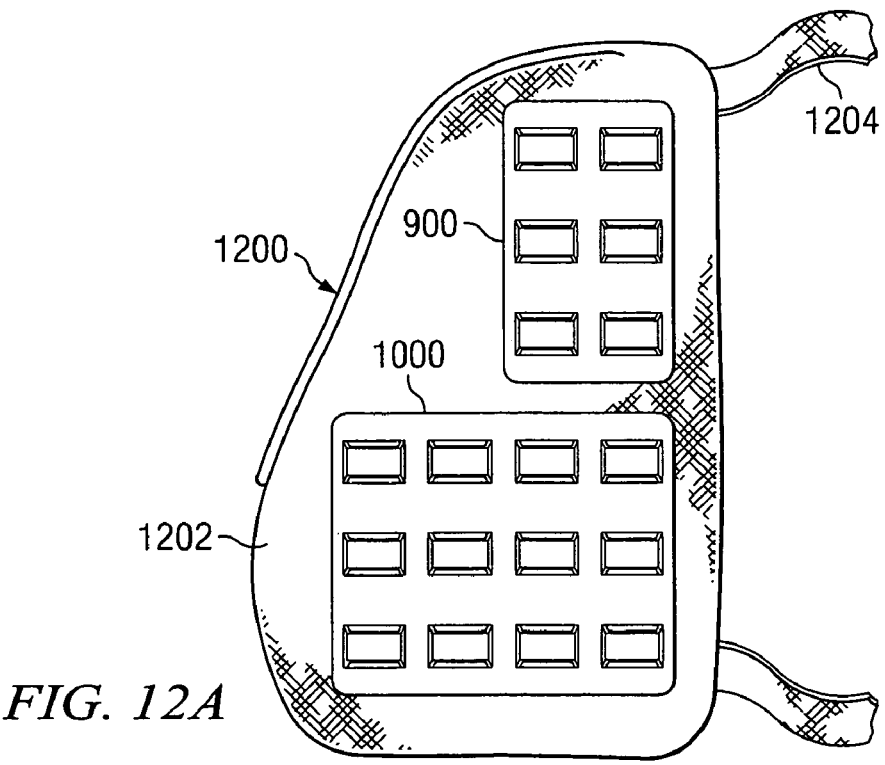
FIGS. 12A-12C illustrate a backpack fitted with various substrate adapters of the current invention. In particular.
Figure 12B:
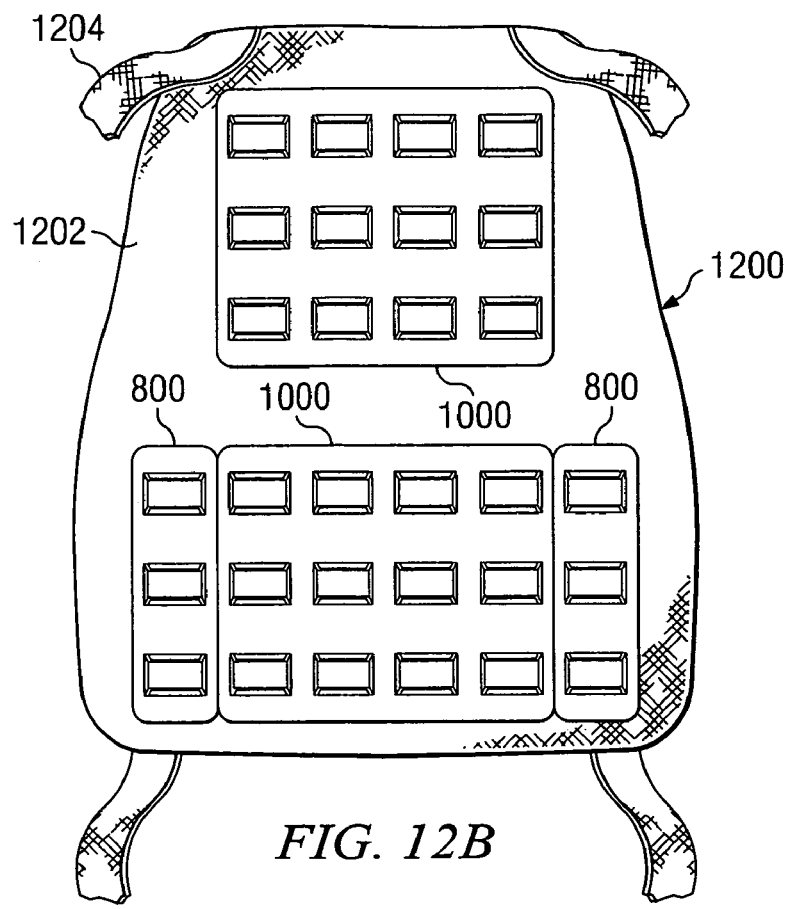
Figure 12C:
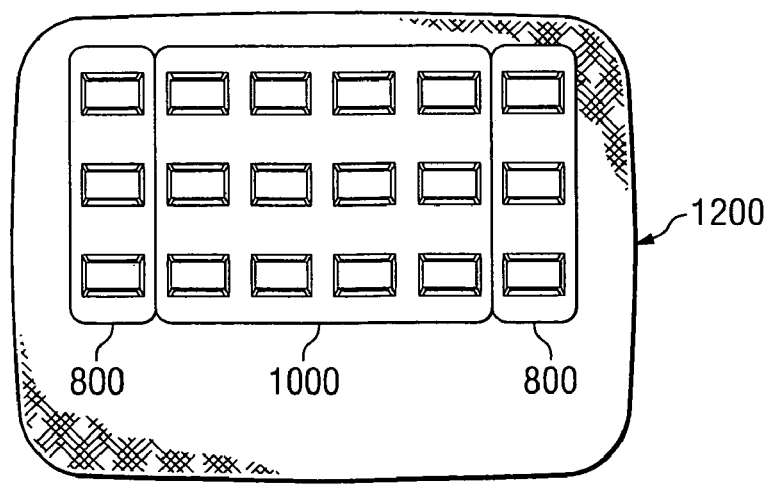

Referring now to FIGS. 12a-12c, a tactical backpack 1200 is shown. The backpack 1200 includes a fabric body 1202 and carrying straps 1204. Affixed to the rear, side and lower surfaces of the body 1202 are a variety of single-column, dual-column and quad-column substrate adapters as previously described. As with the tactical vest, use of the substrate adapters 800, 900 and 1000 will greatly simplify the manufacturing process compared to webbing-type systems. It will also allow the attachment of modular accessories having either the accessory adapters of the current invention or the webbing type attaching system.

Figure 13:
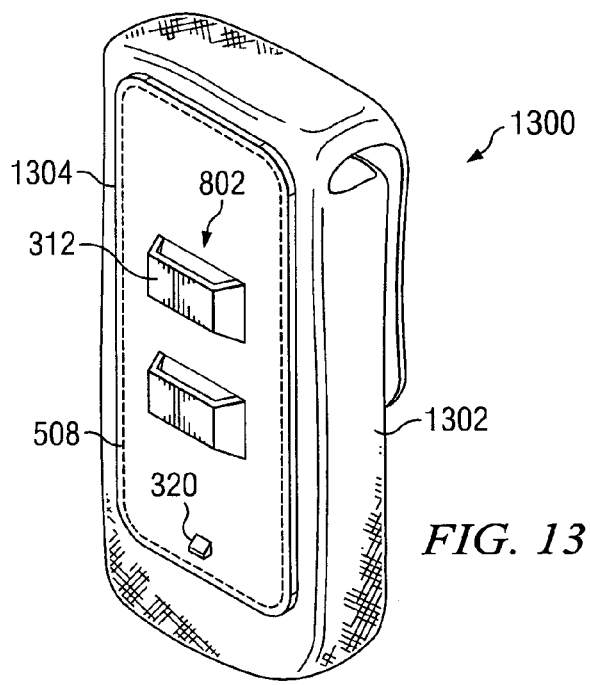
FIG. 13 is a modular pocket fitted with a single column accessory adapter in accordance with another aspect of the current invention.

Referring now to FIG. 13, there is shown a modular accessory, in this case a modular pocket 1300, in accordance with another aspect of the current invention. The modular pocket 1300 includes a fabric body 1302 having an accessory adapter 1304 affixed to the rear side. The accessory adapter 1304 includes a single loop column 802 and one first latch component 320 as previously described. The accessory adapter 1304 is preferably affixed to the modular accessory 1300 by stitching around the periphery of its base, although other affixing means could be used as described herein. It will be appreciated that the modular accessory 1300 may be attached to single-, double- or quad-column substrate adapters 800, 900 and 1000 as previously described in FIGS. 8-10. In addition, when used with a locking member 310, the modular accessory 1300 may be used with standard military equipment having the prior art web-type attaching system.

Figure 14:
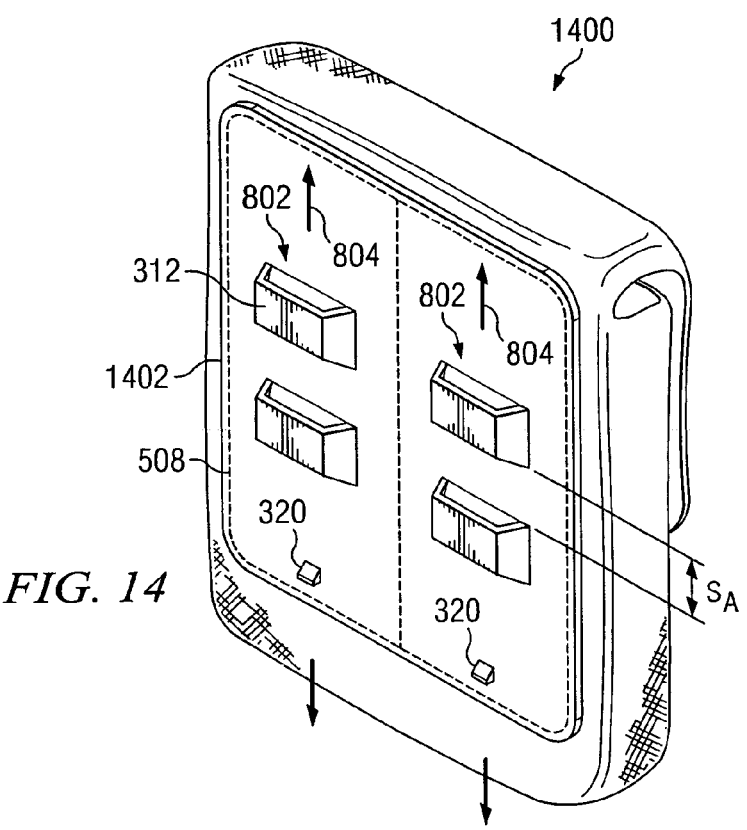
FIG. 14 is a modular pouch fitted with a dual-column accessory adapter in accordance with yet another aspect of the current invention.

Referring now to FIG. 14, there is illustrated another modular accessory, in this case a modular pouch 1400 equipped with a dual-column accessory adapter 1402 having two loop columns 802. The loop columns 802 have parallel column axes 804 and identical spacing $S_A$ between the loops 312 in adjacent loop columns, thereby creating two horizontal "rows" of loops. In addition, a latching component 320 may be provided for each loop column 802 to receive a locking member 310 as previously discussed. The modular accessory 1400 equipped with a double column accessory adapter 1402 can be attached to double- or quad-column substrate adapters 900 or 1000 or, if properly dimensioned, to the prior art webbing based system. It will of course be understood that other accessory adapters having three, four or any other number of parallel loop columns 802 are within the scope of the invention.

As with the single column accessory adapters 306 and substrate adapters 302 previously described, the multi-column adapters 900, 1000 and 1402 are preferably made from a flexible material, for example, polymers such as nylon or polyethylene, or other polymer or elastomer materials. It will further be appreciated that maximum manufacturing savings is obtained when multi-column adapters are molded as single piece articles such as by injection molding. To that end, it will be understood that the multi-column adapters may include features such as the absence of a base under the raised regions which are designed to facilitate molding using two piece molds or other efficient injection molding equipment.

Referring now to FIGS. 15A-15F, there is illustrated an accessory adapter in accordance with another embodiment of the current invention. The accessory adapter 1500 includes a generally flat base 1502 having a top side 1504 and a bottom side 1506. The bottom side 1506 is affixed to the accessory object (not shown). A recessed channel 1508 is formed around the periphery of base 1502 to provide a location for stitching if that method is used to affix the adapter to the accessory. As previously described, other means of affixing the adapter 1500 to the accessory object may be used, for example, adhesives, heat fusing or mechanical fasteners.

Figure 15A:
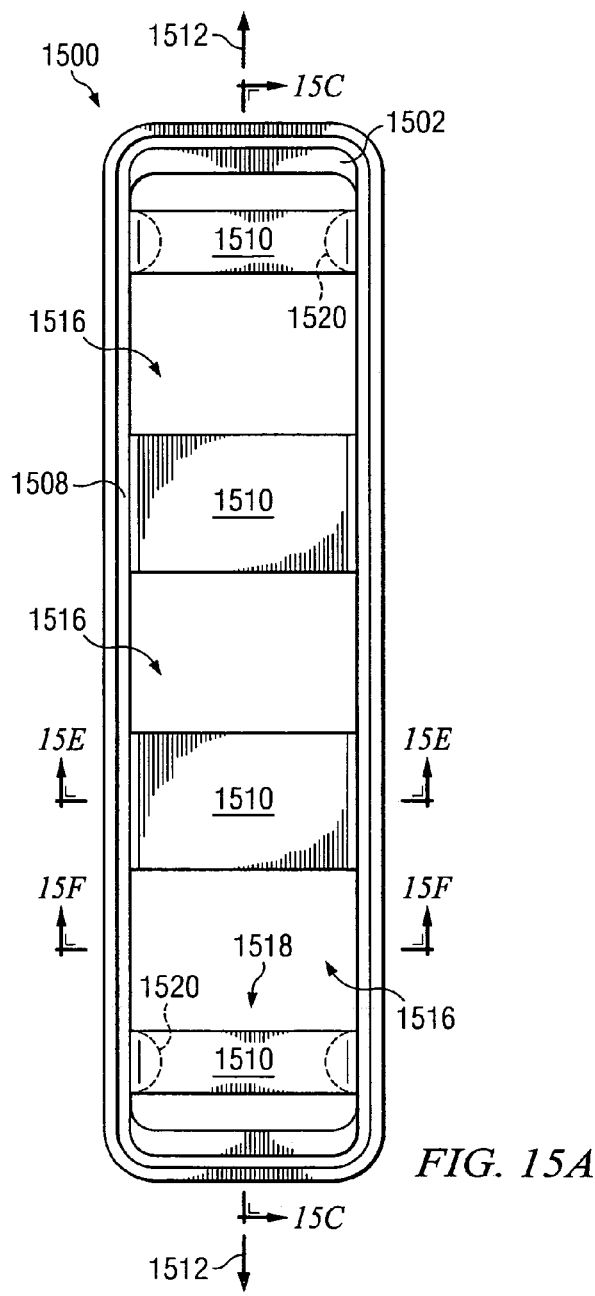
Figure 15B:
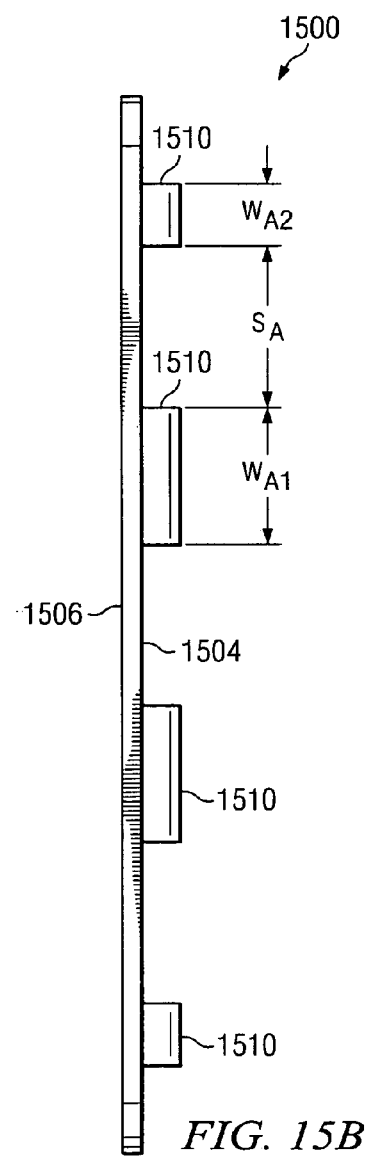
FIG. 15B is a side view.
Figure 15C:
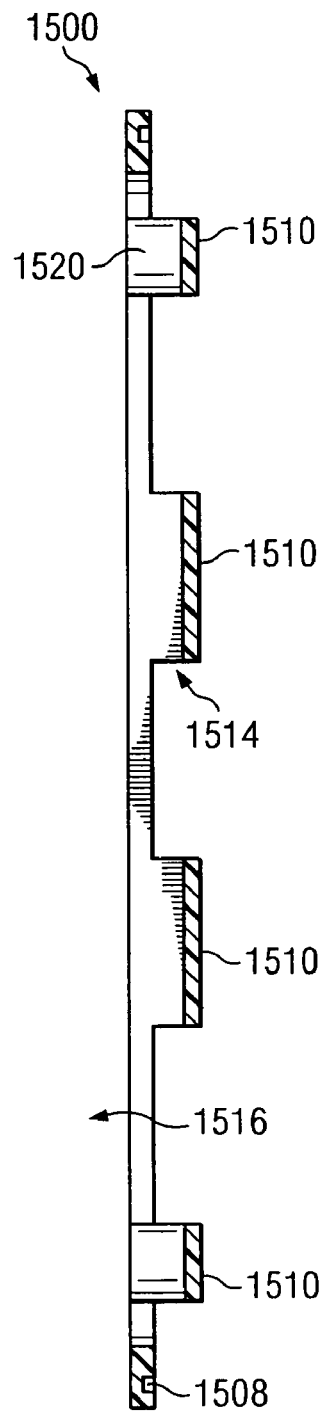
FIG. 15C is a side cross-sectional view taken along line 15C-15C of FIG. 15A.
Figure 15D:
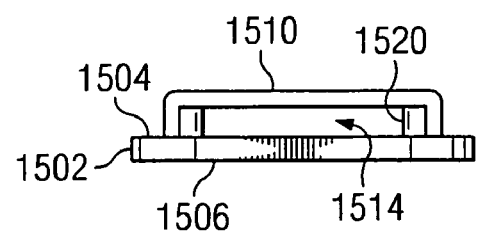
FIG. 15D is an end view.
Figure 15E:
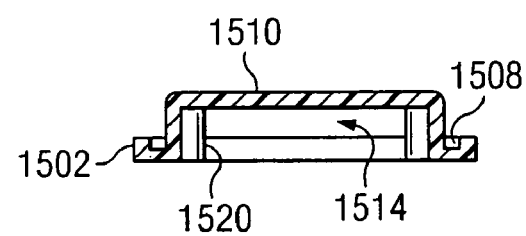
FIG. 15E is an end cross-sectional view taken along line 15E-15E of FIG. 15A.
Figure 15F:
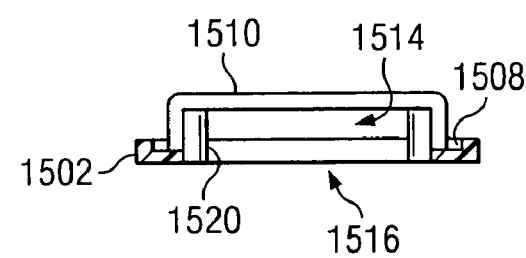
FIG. 15F is an end cross-sectional view taken along line 15F-15F of FIG. 15A.

As with the accessory adapters previously described, a number of raised regions or loops 1510 are formed on a top side 1504 of base 1502 and spaced apart along a main axis 1512. The raised regions 1510 define a series of passages 1514 with respect to the base 1502 (as best seen in FIGS. 15D-15F). In the embodiment shown, the region of the base 1502 below the raised regions 1510 has been cut out to facilitate molding. It will be noted that the accessory adapter 1500 includes four raised regions 1510, and that the inner two raised regions have a width $W_{A1}$ that is different from the width $W_{A2}$ of the outer two raised regions. However, as previously described, the spacing $S_A$ between the locations of the raised regions 1510 are dimensioned to cooperate with the spacing of the raised regions of the substrate adapter in order to position at least one of the raised regions on one of the adapters between at least two of the raised regions on the other adapter when the two adapters are placed in operational alignment.

In contrast to the accessory adapters previously described, the base 1502 of the accessory adapter 1500 has cutouts (i.e., holes) 1516 formed between each of the raised regions 1510. These cutouts 1516 are dimensioned to receive therein a portion of the raised regions of the corresponding substrate adapter when the two adapters are brought into operational alignment. In other words, the raised regions of the substrate adapter may partially protrude into the cutouts 1516 in the accessory adapter. This configuration allows the overall thickness of the attachment system (i.e., the combined thickness of the substrate adapter and the accessory adapter when in operational alignment) to be minimized.

The accessory adapter 1500 includes a first latching component 1518 which will cooperate with a second latching component on the locking member in order to secure the locking member in place after the accessory object has been mounted to the substrate object. In the embodiment shown, the first latching component 1518 comprises a pair of rounded members 1520 extending into the passage 1514 underneath the outer two raised members 1510. As best seen in FIGS. 15D-15F, the rounded members 1520 narrow the passage 1514 beneath the outermost raised regions. As will be further described below, a suitably configured locking member will coact with the rounded members 1520 in order to secure the locking member in place. By placing a first latching component 1518 at each end of the accessory adapter 1500, the adapter becomes bi-directional. In other words, it may be locked by inserting the locking member from either direction. This bi-directional feature of the accessory adapter 1500 eliminates the need to determine which end should be positioned upwards when affixing the adapter to the accessory object. This will speed production and eliminate or reduce the number of errors made during production.

The accessory adapter illustrated in FIGS. 15A-15F is an integral, one-piece article of the type typically formed using injection molding. A one piece article, while not required, is preferred in order to simplify manufacture and assembly. Similarly, construction of the accessory adapter 1500 by injection molding is not required, however, it is also preferred in order to maximize manufacturing simplicity and assembly cost savings. The preferred materials for forming the accessory adapter 1500 are nylon, polypropylene and rubber-like thermoplastics, e.g., sanoprene. It will be understood that these polymers will be used in "solid form" i.e., molded, formed or machined, and not woven from polymer fibers.

Referring now to FIGS. 16A-16F, there is illustrated a substrate adapter in accordance with another embodiment of the current invention. The substrate adapter 1600 is configured to cooperate with the accessory adapter 1500 previously described. It includes a generally flat base 1602 having a top side 1604 and a bottom side 1606. The bottom side 1606 of the base is affixed to the substrate object (not shown). A recessed channel 1608 is provided around the periphery of the base 1602 to facilitate stitching the adapter to the substrate if that method of affixing is used. In other embodiments, other means for affixing the adapter to the object may be used as previously described.

Figure 16A:
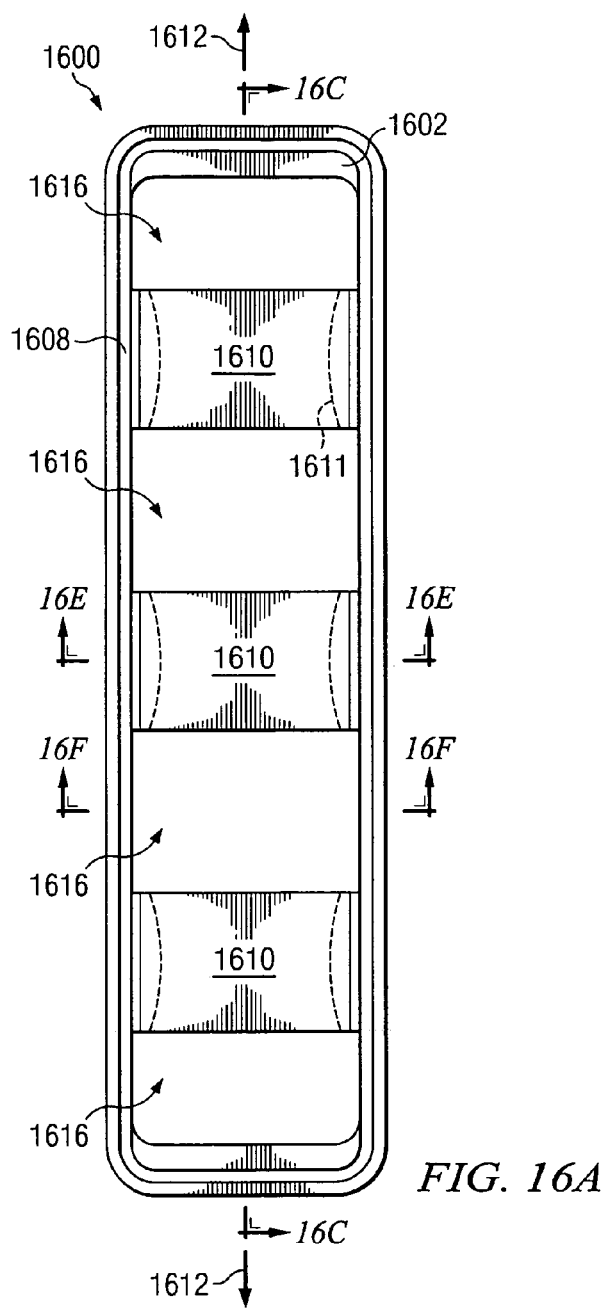
FIGS. 16A-16F illustrate a substrate adapter in accordance with yet another embodiment of the current invention. In particular.
Figure 16B:
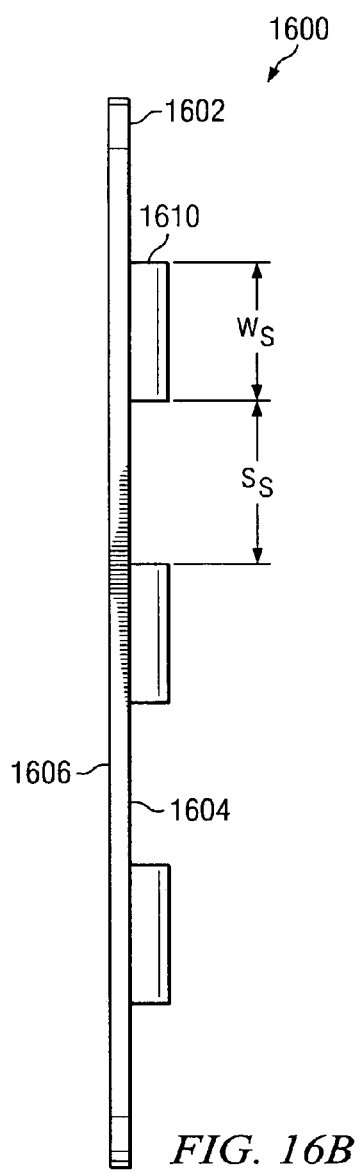
Figure 16C:
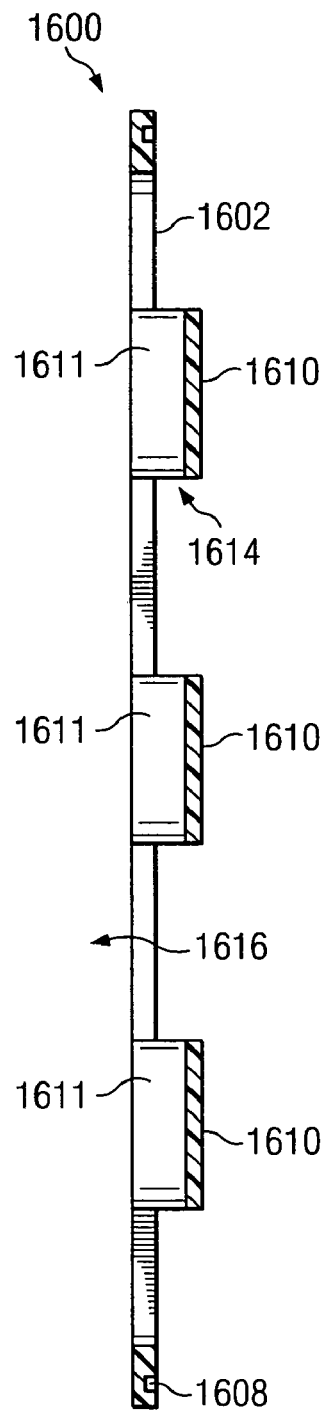
Figure 16D:
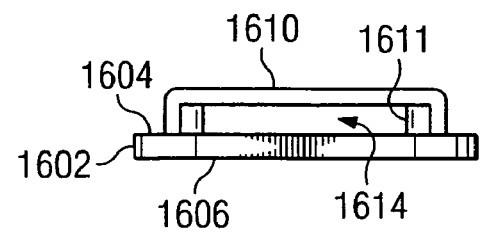
Figure 16E:
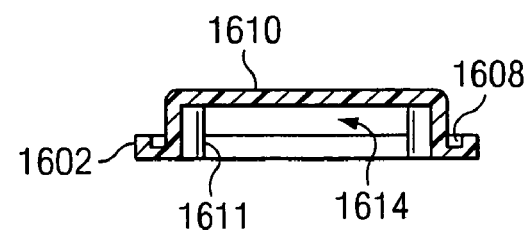
Figure 16F:
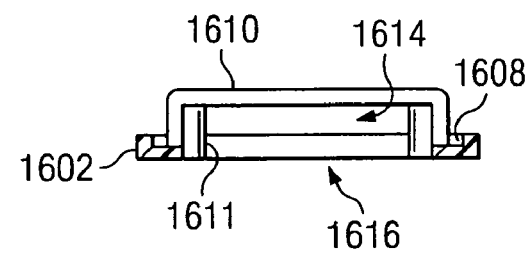

A series of raised regions or loops 1610 are formed on the top side 1604 of the adapter base 1602 and disposed along a main axis 1612. As with the accessory adapter previously described, the raised regions 1610 define a series of passages 1614 with respect to the base 1602 (as best seen in FIGS. 16D-16F). Optionally, guide members 1611 may be formed beneath the raised regions 1610 in order to help position the locking member in the center of the passages 1614 as it is inserted into the adapter. The passages 1614 are oriented parallel to the main axis 1612 and aligned with one another. The width $W_S$ of the raised regions 1610, and the spacing $S_S$ between the raised regions are dimensioned to cooperate with the spacing $S_A$ of the raised regions 1510 on the accessory adapter 1500. In the embodiment illustrated, there are three raised regions 1510 which are dimensioned to interfit between the four raised regions 1510 of the accessory adapter 1500 shown in FIGS. 15A-15F. The substrate adapter 1600 also includes cutouts 1616 formed in the base 1602 between the raised regions 1610. These cutouts 1616 are dimensioned to receive therethrough portions of the raised regions 1510 of the corresponding accessory adapter. Thus, the raised regions 1510 and 1610 of the two adapters may partially protrude into the cutouts 1616 and 1516, respectively, of each other when in operational alignment such that the height (i.e., thickness) of the combined assembly is minimized. The configurations of the raised regions on both the accessory adapter 1500 and the substrate adapter 1600 are configured such that the respective passages 1514 and 1516 will be aligned vertically as well as longitudinally when the adapters are brought into operational alignment.

Figure 17:
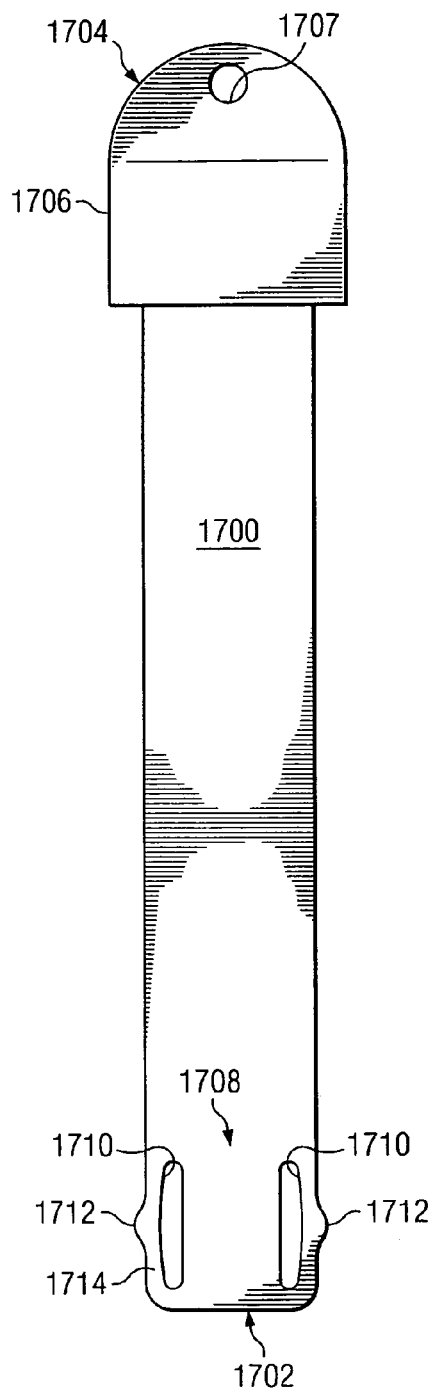
FIG. 17 illustrates a locking member for use with the adapters of FIGS. 15A-F and 16A-F.

The substrate adapter 1600 illustrated in FIGS. 16A-16F is a one piece molded article of the type typically formed by injection molding. While not required, a one piece article is preferred for ease of manufacturing and assembly. As previously discussed, injection molding is not required to form the substrate adapter 1600 but is preferred due to the cost savings typically associated with that type of production. Polymer materials believed to be most suitable for forming the substrate adapter 1600 include nylons such as nylon 66, polypropylenes and flexible thermoplastics. It will be understood that these polymers are used in solid form, and not woven from polymer fibers Referring now to FIG. 17, there is illustrated a locking member suitable for use with the accessory adapter 1500 and substrate adapter 1600 previously described. The locking member 1700 is dimensioned to be removably insertable through the passages 1514 and 1614 under the raised regions 1510 and 1610 of the accessory and substrate adapters, respectively. The locking member 1700 has a leading end 1702 for insertion through the passages 1514 and 1614. The locking member 1700 further has a trailing end 1704 designed to prevent the locking member from passing completely through the passages. In the embodiment shown, the trailing end 1704 includes a handle 1706 which may be sized and/or textured to allow the user to grip the locking member 1700 even when wearing gloves. A hole 1707 may be provided in the handle 1706 for receiving a tether cord (not shown) that may be connected to the accessory to prevent loss of the locking member 1700.

The locking member 1700 also includes a second latching component 1708 of the latching mechanism for releasably securing the locking member in place after it has been inserted into the accessory adapter 1500. In this embodiment, the second latching component 1708 comprises a pair of holes 1710 and a pair of lateral projections 1712 both formed on the leading end 1702 of the locking member. The holes 1710 form a thinned region 1714 on each side of the locking member. This thinned region 1714 is flexible enough to allow the projections 1712 to move laterally inward as they pass the first latching components 1520 on the accessory adapter and then spring back into position after passing the projections in order to secure the locking member in imposition.

Figure 18:
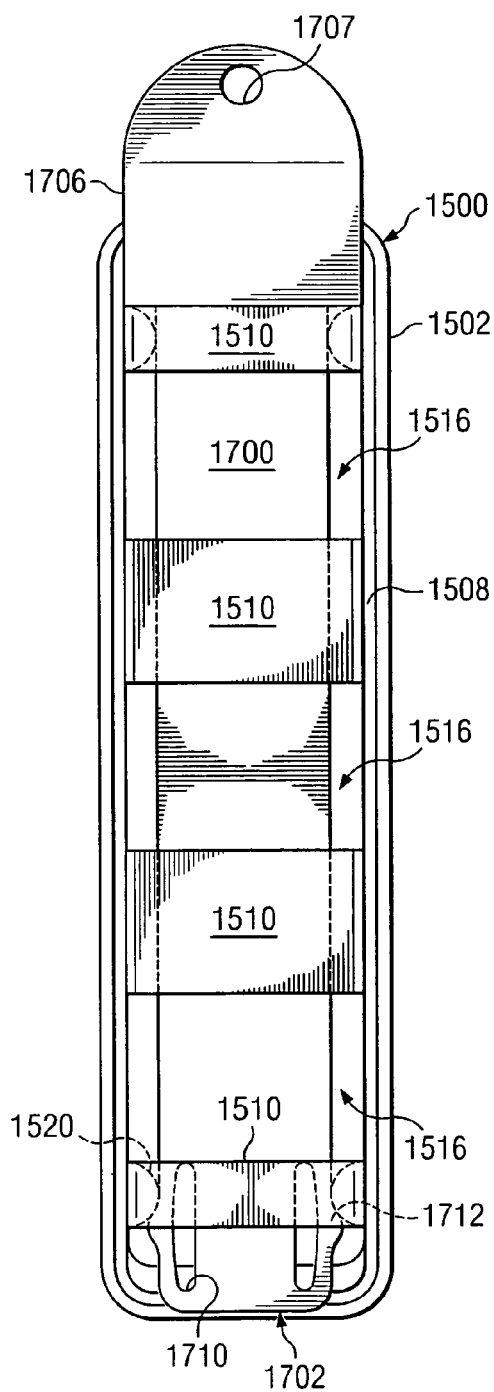
FIG. 18 is a top view of the locking member of FIG. 17 operably inserted into the accessory adapter of FIG. 15A.

Referring now to FIG. 18, the locking member 1700 is shown in its inserted and secured position within accessory member 1500. In particular, it can be seen how the projections 1712 at the leading end 1702 of the locking member cooperate with the rounded members 1520 of the accessory adapter in order to secure the locking member in place. It will be appreciated that the locking member 1700 can be inserted from either end of the accessory adapter 1500 and will lock securely due to the bi-directional locking features of the adapter.

Although several embodiments have been described in detail, it should be understood that various changes, substitutions and alterations can be made therein without departing from the spirit and scope of the invention as defined by the appended claims.

What is claimed is:

1. A substrate adapter for removably securing an accessory object to a substrate object using a discrete locking member, the accessory object including a top side having a plurality of loops disposed at spaced apart locations along a column axis forming at least one loop column and oriented so as to define a common passage therethrough, the locking member being removably insertable through the common passage of the accessory object, the substrate adapter comprising:
 a base having a bottom side affixable to a substrate object by sewing around the periphery of the base and a top side having at least two loop columns formed thereon;
 each loop column including a plurality of loops disposed at spaced apart locations along a column axis and oriented so as to define a common passage therethrough, all of the column axes being parallel to one another;
 wherein the adapter is formed of an injection molded polymer material and wherein the spacing between the loops of the substrate adapter is dimensioned to position at least one of the loops of one of the loop columns of one of the adapter and accessory object between at least two of the loops of a corresponding loop column of the other one of the adapter and accessory object when the adapter and accessory object are placed in operational alignment with their respective top sides together and with the common passages of the corresponding loop columns aligned; and
 wherein insertion of the locking member into the common passages of the adapter and accessory object when the adapter and accessory object are in operational alignment interlocks the accessory object to the substrate object, and withdrawal of the locking member from the common passages releases the accessory object from the substrate object.

2. The substrate adapter of claim 1, wherein the base of the substrate adapter does not extend beneath raised areas of each loop.

3. The substrate adapter of claim 1, wherein exactly two loop columns are formed thereon.

4. The substrate adapter of claim 1, wherein exactly four loop columns are formed thereon.

5. A wearable garment comprising:
 a garment body constituting a fabric substrate; and
 a substrate adapter in accordance with claim 1 affixed to the garment body by sewing.

6. An accessory adapter for removably securing an accessory object to a substrate object in conjunction with a locking member having a first component of a latching mechanism, the substrate object including a top side having a plurality of loops disposed at spaced apart locations along a column axis and oriented so as to define a common passage therethrough, the accessory adapter comprising:

a base having a bottom side affixable to an accessory object by sewing around the periphery of the base and a top side having at least one loop column formed thereon, each loop column including a plurality of loops disposed at spaced apart locations along a column axis and oriented so as to define a common passage therethrough, all of the column axes being parallel to one another;

at least one second component of the latching mechanism, each second component of the latching mechanism being disposed on the adapter in association with a particular loop column for releasably securing the locking member in a predetermined position of engagement with the accessory adapter when the locking member is inserted into the common passage of the respective loop column;

wherein the adapter is formed of an injection molded polymer material.

7. The accessory adapter of claim 6, wherein the base of the accessory adapter does not extend beneath raised areas of each loop.

8. An accessory object comprising:
a modular fabric pocket; and
an accessory adapter in accordance with claim 6 affixed to the pocket.

9. The accessory adapter of claim 6 further comprising a recessed channel formed around the periphery of the base to provide a location for sewing the adapter to an accessory object.

10. The accessory adapter of claim 6 wherein each of the loops in a column comprises a raised area so as to define a common passage through the loops.

11. The accessory adapter of claim 10 further comprising cutouts formed between the raised areas, the cutouts dimensioned to receive the raised areas of corresponding loops affixed to a substrate object.

12. The accessory adapter of claim 6 wherein second component of the latching mechanism comprises at least one rounded member extending into the passage.

13. The accessory adapter of claim 6 wherein the second component of the latching mechanism comprises a protrusion for engaging the first component of the latching mechanism.

14. The accessory adapter of claim 13 wherein the protrusion comprises a ramp-like projection having an inclined face.

15. The accessory adapter of claim 9 further comprising a first second component of the latching mechanism aligned with a particular loop column for releasably securing the locking member in a predetermined position of engagement with the accessory adapter when the locking member is inserted into the common passage of the respective loop column and a second second component disposed in association with the loop column at the opposite end of the loop column from the first second component.

16. An accessory adapter for removably securing an accessory object to a substrate object in conjunction with a locking member having a first component of a latching mechanism, the substrate object including a top side having a plurality of loops disposed at spaced apart locations along a column axis and oriented so as to define a common passage therethrough, the accessory adapter comprising:

a base having a bottom side for affixing to the accessory object and a top side having at least one loop column formed thereon, each loop column including a plurality of loops, each of the loops including a raised area, disposed at spaced apart locations along a column axis and oriented so as to define a common passage therethrough, all of the column axes being parallel to one another;

at least one second component of the latching mechanism, each second component of the latching mechanism being associated with a particular loop column for releasably securing the locking member in a predetermined position of engagement with the accessory adapter when the locking member is inserted into the common passage of the respective loop column; and wherein the base of the accessory adapter does not extend beneath the respective raised areas of each loop.

17. The accessory adapter of claim 16 wherein the adapter is affixable to an accessory object by sewing around the periphery of the base.

18. The accessory adapter of claim 16 wherein the adapter is formed of a solid polymer material.

19. The accessory adapter of claim 16 wherein the second component of the latching mechanism comprises one of a rounded member extending into the passage beneath at least one of the raised regions and a protrusion for engaging the first component of the latching member.

\* \* \* \* \*